United States Patent [19]
Peterson

[11] 4,131,548
[45] Dec. 26, 1978

[54] ROTARY DISC FILTER SCRAPER APPARATUS

[75] Inventor: C. Lynn Peterson, Salt Lake City, Utah

[73] Assignee: Peterson Filters Corporation, Salt Lake City, Utah

[21] Appl. No.: 847,071

[22] Filed: Oct. 31, 1977

[51] Int. Cl.$^2$ ............................................. B01D 33/36
[52] U.S. Cl. .................................. 210/331; 210/332; 210/396
[58] Field of Search ............... 210/331, 332, 334, 346, 210/347, 396, 397, 486, 487; 15/256.5

[56] References Cited
U.S. PATENT DOCUMENTS

| | | | |
|---|---|---|---|
| 2,885,083 | 5/1959 | Peterson et al. | 210/396 |
| 2,974,802 | 3/1961 | Morehouse et al. | 210/396 |
| 3,409,134 | 11/1968 | Wallace et al. | 210/334 X |
| 3,643,806 | 2/1972 | O'Cheskey | 210/332 X |

Primary Examiner—William A. Cuchlinski, Jr.
Attorney, Agent, or Firm—Bruce G. Klaas

[57] ABSTRACT

A rotary disc filter machine having a rigid scraper blade member supported on radially innermost and outermost circumferentially extending side surfaces of a filter disc unit by cake scraping and blade supporting shoe devices mounted on the radially innermost and outermost end portions of the scraper blade member, the radially innermost end portion of the scraper blade member having a pivotal connection relative to the tank means to enable axial movement of the blade member with the filter disc unit caused by wobble of the filter disc unit while being mounted in a fixed rigid adjusted position relative to the filter disc unit by mounting bracket devices enabling various radial, circumferential, and axial adjustments of the scraper blade position and gap relative to the filter disc unit which is axially confined at the radially outermost portion thereof by guide and abutment devices mounted on the side wall plates of the cake removal slots.

31 Claims, 15 Drawing Figures

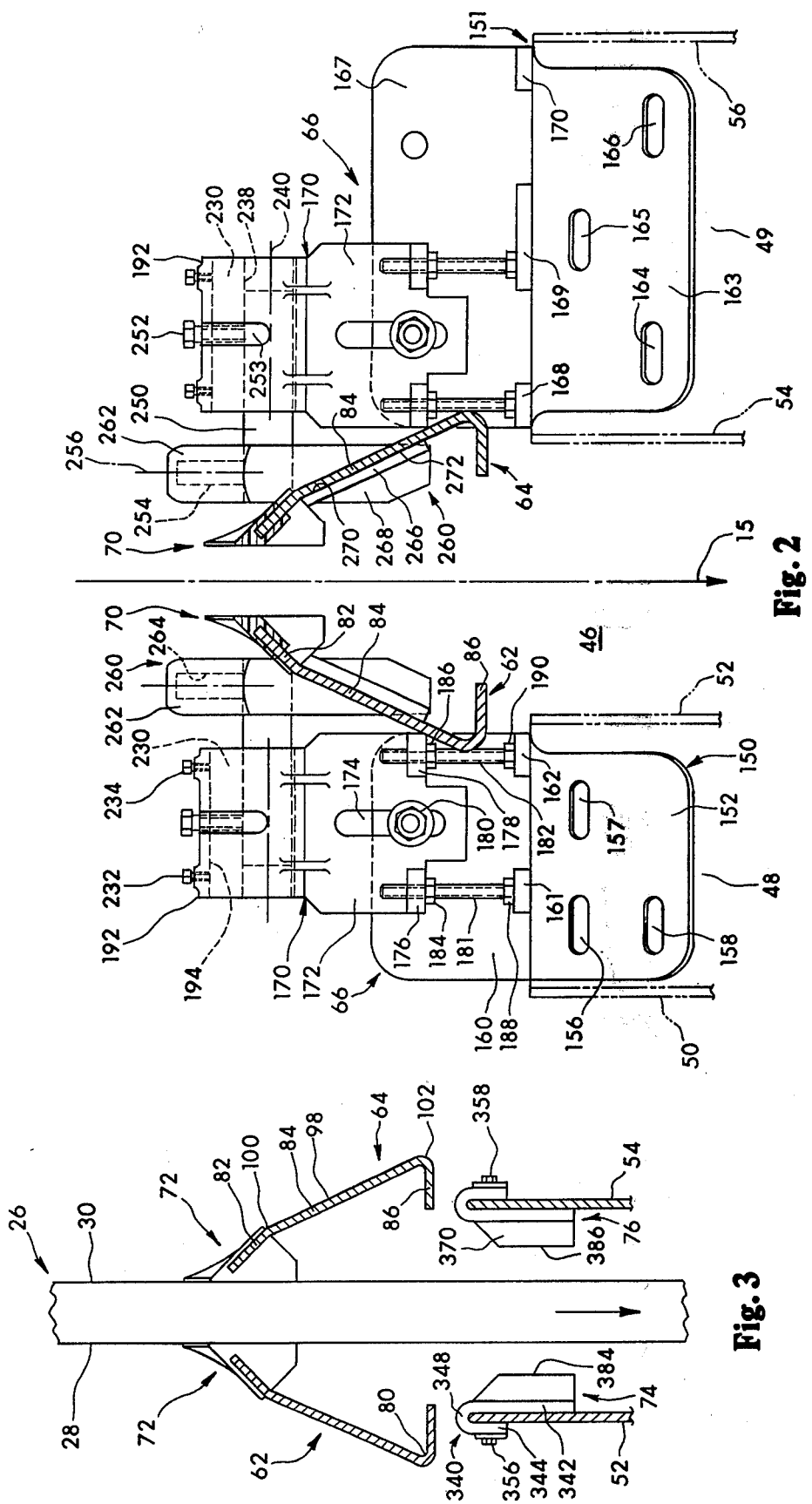

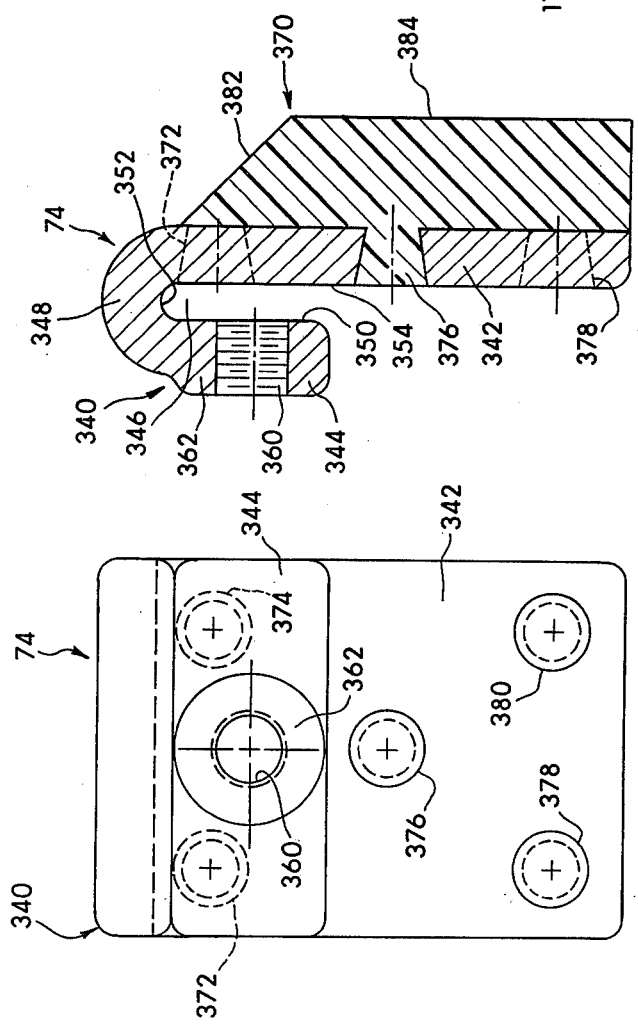

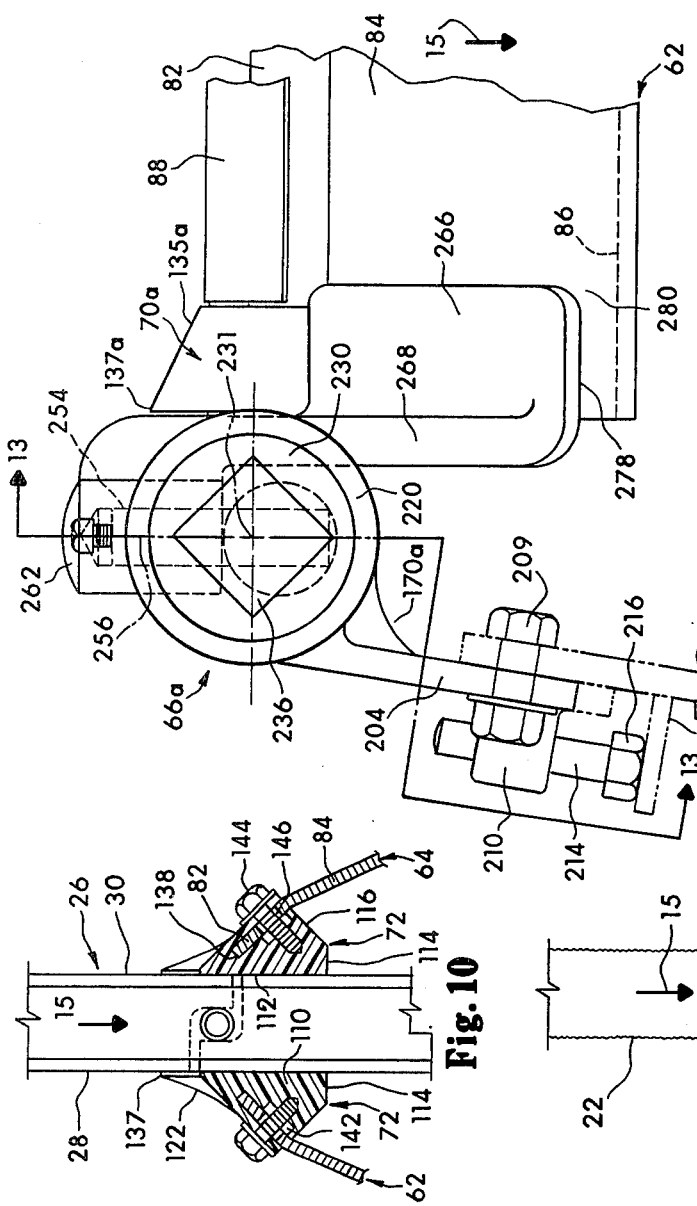

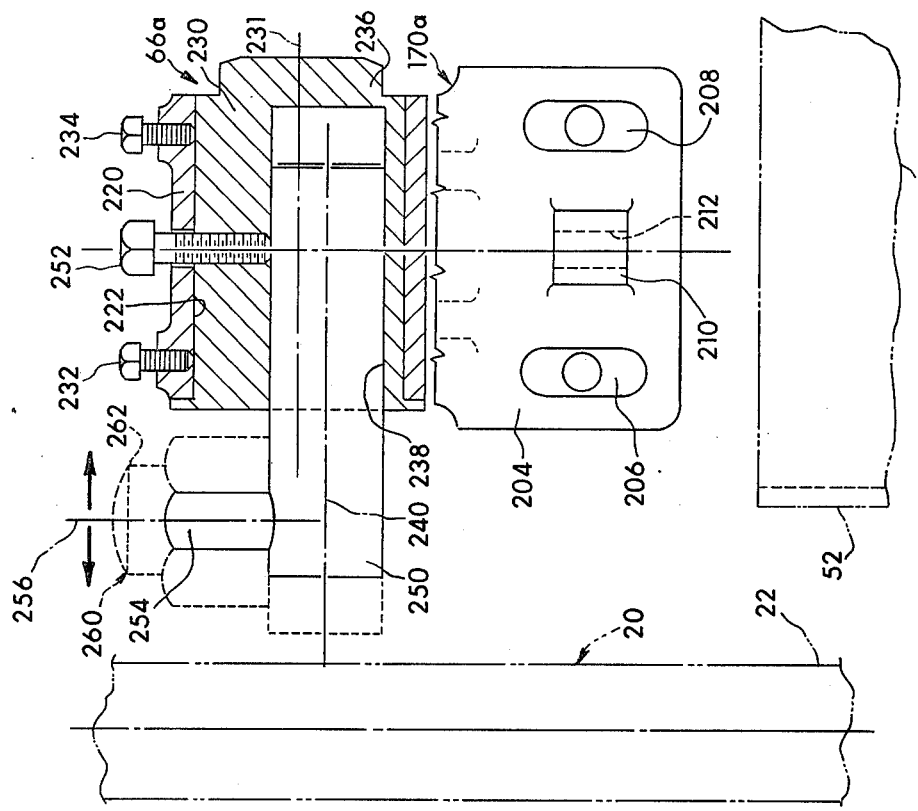
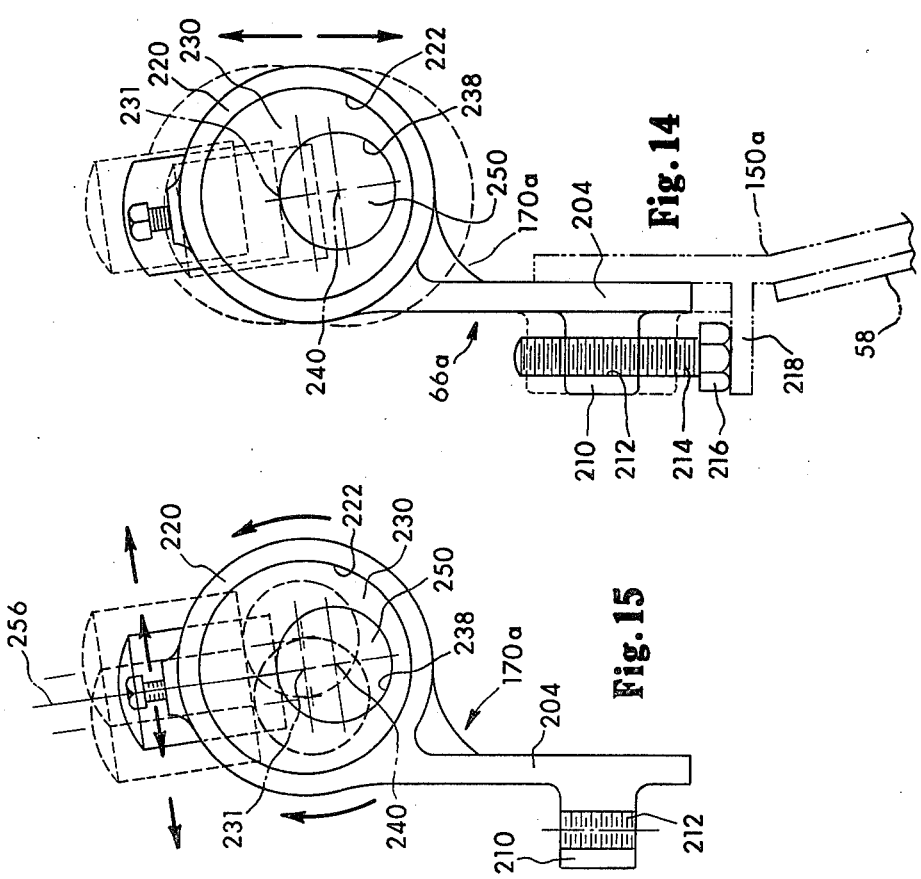
Fig. 13
Fig. 14
Fig. 15

ROTARY DISC FILTER SCRAPER APPARATUS

BACKGROUND AND SUMMARY OF THE INVENTION

This invention relates generally to rotary disc filter machines and, more particularly, to scraper blade apparatus, scraper blade mounting apparatus and filter disc guide and support apparatus for such rotary disc filter machines.

The general construction and arrangement of such rotary disc filter machines is shown and described in many prior patents such as Logue, et al., U.S. Pat. No. 2,932,402 and Oliver, Jr., et al., U.S. Pat. No. 2,964,194. In general, rotary disc filter machines of the type to which this invention relates comprise a semi-cylindrical slurry tank means for receiving and holding a slurry of solid materials suspended in a liquid material. A horizontal rotatable center shaft means extends across the tank means. A plurality of axially spaced annular filter disc units are mounted on the center shaft means for rotation therewith through the slurry in the tank means during a portion of each revolution. Each of the filter disc units comprise an assembly of separate filter disc segments having axially spaced radially and circumferentially extending cake holding side surfaces formed by a porous filter media mounted thereon. Each filter disc segment comprises a radially innermost shaft connecting means having opposed parallel axially spaced flat circumferentially extending side surfaces located in radially inwardly circumjacent juxtaposition to the radially inwardmost end portions of the filter media side surfaces and a radially outermost filter media clamping means having opposed parallel axially spaced flat circumferentially extending side surfaces located in radially outwardly circumjacent juxtaposition to the radially outermost end portions of the filter media side surfaces. The circumferentially adjoining opposed parallel side surfaces of the shaft connecting means and the circumferentially adjoining opposed parallel side surfaces of the filter media clamping means form substantially circumferentially continuous radially innermost and radially outermost axially spaced parallel annular side support surfaces. Vacuum applying means are effective through passages in the center shaft means, the shaft connecting means, and each filter segment to apply vacuum to the filter media side surfaces during rotation through the slurry in the tank means to cause flow of the liquid filtrate material therethrough and to cause the solid cake materials to be held on the filter media side surfaces. Then, during downward rotation of the filter segments toward the slurry tank means, the cake material is removed from the filter media side surfaces by scraper blade means fixedly mounted relative to and extending radially across the filter media side surfaces. The cake removal side of the tank means is provided with alternating axially spaced filter disc unit receiving chambers (slots) connected to the slurry tank means and cake removal slots therebetween defined by a plurality of axially spaced radially extending side plate means and circumferentially extending radially innermost and radially outermost end plate means. The scraper blade means are constructed and arranged to remove the cake from the filter media side surfaces above the cake removal slots and direct the removed filter cake into the cake removal slots as each filter disc segment rotates past the scraper blade means into the disc unit receiving chambers (slots).

Various types of scraper blade apparatus and scraper blade mounting apparatus have been previously employed including, for example, apparatus of the type disclosed in Peterson, et al., U.S. Pat. No. 2,855,083 and Peterson U.S. Pat. No. 3,080,597. The scraper blade apparatus of Peterson U.S. Pat. No. 2,885,083 comprises a curved blade member having curved guide shoes on the radially innermost and outermost end portions of the blade member for supportive sliding engagement with the radially innermost and outermost peripheral circumferentially extending surfaces of the filter disc segments of each filter disc unit. The radially innermost end portion of the blade member is also attached to tank means by a pivotally connected mounting bracket means to enable axial movement of the blade member with the filter disc unit caused by wobble of the filter disc unit during rotation.

The present invention involves improvements in a scraper blade assembly and scraper blade mounting bracket means of the general type of Peterson U.S. Pat. No. 2,885,083 and, in addition, filter disc unit guide and locator means for controlling disc wobble and preventing contact with the cake slots during rotation of the filter disc units. The new and improved apparatus of the present invention is useful in combination to provide overall advantages and improvements in removal of cake from filter disc units. In addition, particular advantages and improvements have been provided by particular parts of the apparatus which may be used separately with other types of disc filter apparatus. Among the advantages and improvements of the present invention are the provision of:

(1) a more rigid, relatively low cost, main scaper blade member having more accurate closely controlled dimensional characteristics to reduce alignment problems caused by bending and distortion in use and in manufacture resulting in loss of maintenance of a uniform width gap between the scraper blade and the filter media side surfaces;

(2) combination cake scraping and blade supporting shoe devices which enable very accurate positioning of the scraper blade member relative to the filter media side surfaces and also continuously scrapes off and removes cake from the shoe support surfaces on the filter disc unit to maintain continuous slidable abutting supporting contact between the shoe and the shoe support surfaces to overcome the prior art problem of cake build-up on the shoe support surfaces which lifted the blade member away from the filter media side surfaces to preclude maintenance of a uniform blade-filter media surface gap;

(3) filter disc unit guide and abutment devices mounted in the disc unit rotational slots on the cake removal side of the tank means to prevent excessive wobble of the filter disc unit and to prevent contact between the filter disc unit and the side plates of the cake removal slots; and (4) blade mounting bracket means which enable rigid accurate adjustable mounting of the scraper blade member relative to the filter disc unit while facilitating the accurate assembly of the parts and reducing the time required for accurate assembly of the parts.

In general the new and improved apparatus of the present invention comprises:

A. Main cake scraper blade assembly means having a one piece member of elongated metal plate material formed into a rigid cross-sectional configuration including:

(1) a relatively narrow width axially inner most rigid elongated flange portion located axially next adjacent the associated radially and circumferentially extending filter media surface and being inclined relative thereto at a first acute angle of inclination relative thereto and extending axially outwardly and away therefrom in the general direction of rotation of the associated filter disc unit;

(2) a relatively wide rigid elongated central panel portion rigidly connected to and located axially next adjacent to and being inclined relative to the inner flange portion and also being inclined relative to the adjacent associated filter media surface at a second acute angle of inclination relative thereto, less than the first angle of inclination of the innermost flange portion, and also extending axially outwardly and away from the adjacent associated filter media surface in the general direction of rotation; and (3) a relatively narrow width elongated rigid axially outermost flange portion extending along the entire length of the central panel portion and extending toward the associated filter media surface and intersecting the central panel portion at an acute angle to form a rigid intersection therewith.

B. Cake scraping and blade supporting shoe means, preferably made of one piece of molded plastic material, mounted on the radially innermost and on the radially outermost end portions of the scraper blade means for both (1) supporting and axially locating the scraper blade means relative to the associated filter media surfaces of the filter disc segments of the associated filter disc unit, and (2) scraping and removing filter cake from the associated radially innermost and outermost circumferentially extending peripheral support surfaces of the filter disc segments of the associated filter disc unit with which the shoe means is normally abuttingly slidably engaged.

C. Radially innermost and outermost blade mounting bracket assembly means for pivotally supporting the scraper blade means radially across the filter disc segments of the associated filter disc unit in fixed axially spaced relationship to the associated filter media surface while enabling axial displacement with the filter disc unit during wobble, the radially innermost mounting bracket assembly means including:

(1) a first bracket means mounted on the tank means axially adjacent the associated filter disc unit;

(2) a second bracket means mounted on the first bracket means with first blade position adjustment means therebetween for variable adjustment of the circumferential location of the second bracket means relative to the first bracket means and relative to the associated filter disc unit;

(3) a third bracket means attached at one end to and supporting the radially innermost end portion of the central panel portion of the blade member for adjustably connecting the blade member to the second bracket means through pivotal connecting means on an axially extending axially adjustable adjustment shaft means mounted in an axially extending eccentric shaft mounting bore means in a rotatable shaft support sleeve means rotatably mounted on axially extending sleeve mounting bore means in hub means on the second bracket means, the pivotal connecting means enabling swinging movement of the blade member axially inwardly and outwardly with the associated filter disc unit during wobble, the axially adjustable shaft means providing second blade adjustment means enabling substantial axial inward and outward adjustment of the normal operating position of the blade member relative to the associated filter disc unit, the eccentric shaft mounting bore means and the rotatable shaft support sleeve means providing third blade adjustment means enabling limited axial inward and outward adjustment as well as simultaneous limited circumferential adjustment of the position of the radially innermost end portion of the blade member and the radially innermost cake scraping-blade supporting shoe means attached thereto relative to the associated filter disc unit.

D. Filter disc unit guide and abutment means, having an abutment block member, preferably made of one piece of molded plastic material, mounted on the side plates of the cake removal slot means for intermittent sliding abutting engagement with the radially outermost filter media support surfaces of the filter disc segments of the associated filter disc unit to limit disc wobble within predetermined axial variation limits and to prevent contact with the cake removal slot side plates.

BRIEF DESCRIPTION OF THE DRAWING

Presently preferred and illustrative embodiments of the invention are shown in the accompanying drawing wherein:

FIG. 2 is an enlarged cross-sectional view of a portion of the apparatus of FIG. 1, with parts removed, taken along the line 2—2 in FIG. 1;

FIG. 3 is an enlarged cross-sectional view of a portion of the apparatus of FIG. 1, with parts removed, taken along the line 3—3 in FIG. 1;

FIG. 4 is an enlarged isometric view of a scraper-support shoe device shown in FIGS. 1-3;

FIG. 5 is an enlarged cross-sectional view of a portion of the apparatus of FIG. 1, with parts removed, taken along line 5—5 in FIG. 1;

FIG. 6 is an enlarged side elevational view of a filter disc unit guide and locating device shown in FIG. 5;

FIG. 7 is a cross-sectional view of the device in FIG. 6 taken along the line 7—7 in FIG. 6;

FIG. 8 is an outer end view of the apparatus of FIG. 1, with parts removed, taken in the direction of the arrow 8 in FIG. 1;

FIG. 9 is a cross-sectional view of a portion of the apparatus of FIG. 1, with parts removed, taken along the line 9—9 in FIG. 1;

FIG. 10 is a cross-sectional view of a portion of the apparatus of FIG. 1, with parts removed and transposed, taken along the line 10—10 in FIG. 1;

FIG. 11 is a cross-sectional view of a portion of the apparatus of FIG. 1, with parts removed and transposed, taken along line 11—11 in FIG. 1;

FIG. 12 is an end view of a modified embodiment of the invention;

FIG. 13 is a cross-sectional view, with parts removed, taken along the line 13—13 in FIG. 12 and illustrating a first adjustment feature of the apparatus;

FIG. 14 is an end view of a portion of the apparatus of FIGS. 13 & 14 illustrating a second adjustment feature; and FIG. 15 is another end view of a portion of the apparatus of FIGS. 13-14 illustrating a third adjustment feature.

DETAILED DESCRIPTION

In General

Figure 1:
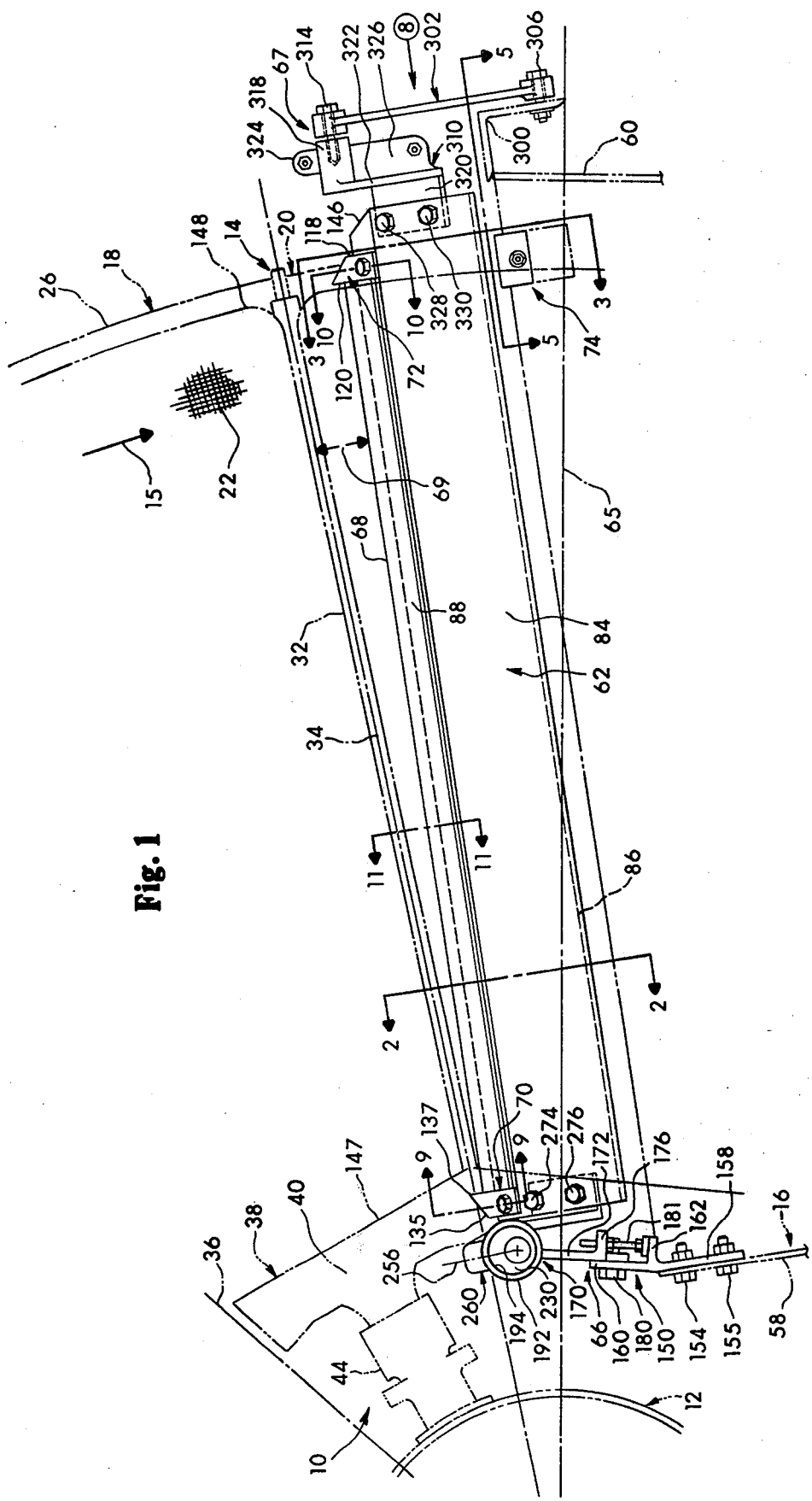
FIG. 1 is a side elevational view of a portion of a rotary disc filter machine showing the apparatus of the invention.

Referring to FIGS. 1-3, a portion of a rotary vacuum disc filter machine 10 is shown which comprises a conventional rotatable horizontally mounted center shaft means 12 having a plurality of conventional axially spaced annular filter disc units 14 mounted thereon for rotation therewith in the direction of arrow 15 through a conventional slurry tank means, the crenulation cake removing portion of which is shown at 16. Each of the filter disc units 14 comprises a plurality of conventional filter disc segments 18, 20 having conventional axially spaced oppositely facing radially and circumferentially extending filter media side surfaces 22, 24, FIG. 11. Each filter disc segment comprises a conventional circumferentially extending radially outermost peripheral clamping means 26, having axially spaced circumferentially extending oppositely facing flat parallel outer peripheral side surfaces 28, 30, FIG. 10; conventional circumferentially spaced radially extending clamping means 32 mounted in abutting engagement along circumferentially spaced radial lines 34, 36; and a conventional radially innermost sector bell connecting and filter material clamping means 38 having axially spaced oppositely facing generally circumferentially extending flat parallel inner peripheral side surfaces 40, 42, FIG. 9. Each sector bell connecting and filter material clamping means 38 is mounted on and connected to the central shaft means 12 by a conventional connector means 44. A plurality of conventional alternating axially spaced circumferentially extending disc unit rotational chambers 46 and cake removal slots 48, 49, FIG. 2, extend along one side of the tank means 16. These crenulated chambers and slots are defined by radially and circumferentially extending side plate means 50, 52, 54, 56 and axially and generally circumferentially downwardly extending radially innermost and radially outer most end plate means 58, 60. Cake slot 48 is a tank end slot which receives cake from only one side of end filter disc unit and is narrower than the intermediate cake slots 49 which receive cake from adjacent sides of adjacent filter disc units. In order to remove the cake material from the filter media side surfaces 22, 24 of the filter disc segments 18, 20 of each filter disc unit 14, radially extending scraper blade means 62, 64 are mounted in juxtaposition to each filter media side surface 22, 24 in proximity to the horizontal center line 65 of the machine. Each scraper blade means is adjustably mounted on and supported by a radially innermost mounting bracket assembly means 66 attached to the radially innermost end plate means 58 and a radially outermost mounting bracket assembly means 67 attached to the radially outermost end plate means 60. In conventional practice, the scraper blade means are mounted in an upwardly outwardly inclined position so that the scraping edge portion 68 is located above the horizontal center line 65 and forms an acute angle 69 with radial line 34 whereby the radially innermost portion of the blade means first engages the cake on each particular filter segment 18 and the radially outermost portion last engages the cake on each particular filter segment. The angle may be varied by use of the present invention and even eliminated entirely so that edge portion 68 extends radially parallel to radial line 34. Peripheral cake scraping and scraper blade supporting shoe means 70, 72 are mounted on the radially innermost and radially outermost end portions of each scraper blade means for supportive scraping engagement with outer peripheral side surfaces 28, 30 and inner peripheral side surfaces 40, 42 of each filter disc segment. Filter disc unit guide and abutment means 74, 76 are mounted on the crenulation side plates 52, 54 in juxtaposition to the outer peripheral side surfaces 28, 30 of the filter disc segments of each filter disc unit to axially locate the filter disc units and prevent contact with the side plate means 52, 54, 56.

The Scraper Blade Assembly Means

Each of the scraper blade assembly means 62, 64 comprise an elongated formed metallic blade member 80, FIGS. 3 & 11, having a relatively narrow width inner scraper shoe mounting flange portion 82 adapted to be located next adjacent the filter media surfaces 22, 24 so as to be inclined relatively thereto at an included angle of approximately 45° to facilitate removal of cake from the filter media surfaces; a central relatively wide panel portion 84 which is also inclined relative to the filter media surfaces at a lesser included angle of approximately 30° to facilitate movement of the filter cake away from the filter disc segments into the cake removal slots 48, 49; and an outer relatively narrow width bracing flange portion 86 extending at substantially a right angle to the filter media surfaces and intersecting the central portion 84 at an acute included angle of approximately 60°. An elongated removable and replaceable blade shoe scraper member 88, FIG. 11, preferably made of wear resistant molded plastic material such as polyurethane, is mounted along the edge portion of inner flange portion 82 by suitable means such as a close fitting mounting channel 90 and adhesive. The blade shoe scraper member has a flat bottom surface 92, adapted to be located initially in parallel closely adjoining relationship to the filter media side surfaces 22, 24 to provide a small width clearance gap, and an inclined outer cake removing surface 94 which faces opposite the direction of movement 15 of the filter disc unit and intersects the bottom surface 92 at an angle of approximately 45° to provide a cake cutting edge surface 96. In this manner, the filter cake is stripped from the filter media side surfaces 22, 24 during rotation of the filter disc unit relative to the blade means 62, 64 with the cake material being first outwardly deflected by the outer inclined surface 94 of scraper shoe member 88, and then outwardly downwardly deflected by the lesser inclined outer surface 98 of the central portion 84 of the blade member 80 to provide a cake movement direction changing means at the intersection 100 of flange portion 82 and panel portion 84. The surfaces 98 extend downwardly and outwardly to the intersection 102 of wall portions 84, 86 which is located axially beyond the planes of adjacent side walls 52, 54 of the cake removal slots 48, 49 to direct the cake thereinto. The relatively sharp angle of intersection 102 serves to prevent cake build-up on the blade member while also substantially rigidifying the entire blade member to prevent undue deflection and wobble under load.

The Cake Scraping And Blade Supporting Shoe Means

The cake scraping and blade supporting shoe means 70, 72 are of identical construction, except for being reverse mirror images of one another, and are preferably made of one piece of molded plastic material such as polyurethane. As best shown in FIGS. 4, 9 and 10, each shoe means 70, 72 comprises a body portion 110 having a flat generally rectangular elongated axially facing bottom surface 112 of relatively large surface area; a flat rectangular downwardly facing rear surface 114 of relatively small surface area which extends at a right angle relative to bottom surface 112; a flat inclined rectangular axially and downwardly facing surface 116 which intersects surface 114 at an angle of approximately 45°; a pair of flat parallel short and long side surfaces 118, 120, FIG. 1; an upwardly facing, axially outwardly and downwardly extending, cake engaging surface 122 having an axially outermost flat portion 124 on one side of an inclined line of tangency 126 extending at an angle of approximately 45° relative to bottom surface 112 and having an axially innermost curved portion 128 on the other side of the line of tangency. The curved portion 128 has a relatively short length side edge portion 130 adjacent short side surface 118 and a relatively long length side edge portion 132 adjacent long side surface 120. The width of side surface 120 along edge portion 132, relative to bottom surface 112, is greater than the width of the opposite portions of side surface 118 along edge portion 130 to provide an inclined trough 133 downwardly in the direction of arrow 134 from edge portion 132 to edge portion 130; and a relatively small area rectangular front surface 135, which is inclined relative to side surface 120 at an angle 136 of approximately 60°, to provide a cake cutting edge surface 137 and which extends at a right angle relative to bottom surface 112.

A rectangular blade receiving slot 138, which extends parallel to flat upper surface portion 124, a bolt hole 140, and a threaded nut member 142, fixedly retained in the body portion 110, provide rigid mounting means for attachment of the shoe means on the radially inner and outer end portions of the inner flange portion 82 of the main scraper blade member 80. As shown in FIGS. 9 & 10, in the assembled position, the inner flange portion 82 is received in the mounting slot 138, which is sized and shaped to closely fit thereover, and a bolt member 144 extends through opening 140, a corresponding opening 146 in the blade flange portion 82, and into nut member 142 to rigidly secure the shoe means 70, 72 on blade flange portion 82. The construction and arrangement is such that, in the mounted position, the flat bottom surfaces 112 extend parallel to and are slidably abuttingly engageable with the spaced parallel inner peripheral side surfaces 40, 42, FIG. 9, and outer peripheral side surfaces 28, 30, FIG. 10, with the upper surfaces 122 facing opposite the direction of movement of the filter disc units and the troughs 133 and front surfaces 135 preferably inclined downwardly away from the scraper blade shoe member 88, FIG. 1. Lower side surfaces 116 extend at right angles to flange portion 82 and lower side surfaces 114 extend at right angles to surfaces 28, 30, and 40, 42 for maximum rigidity of the assembly and for maximum resistance to lifting of the shoe means 70, 72 relative to the surfaces 28, 30 and 40, 42 due to cake build-up on those surfaces. As shown in FIG. 1, the radially outermost edge portion 146 of blade edge portion 82 may be inclined to facilitate cake removal. While there are advantages in locating the upper cutter edge surfaces 137 relatively closely adjacent the radially inner and outer peripheral edges 147, 148 of the filter media surfaces 22, 24 as shown in FIG. 1, a reversely positioned arrangement as shown in FIGS. 12–15 may also provide satisfactory results.

The Innermost Mounting Bracket Assembly Means

The innermost scraper blade mounting bracket assembly means 66, are of substantially identical construction except for being in part mirror images of one another and except for minor variations of size and shape of the lowermost end cake slot attachment bracket member 150 and the lowermost intermediate cake slot attachment bracket members 151. In the preferred embodiment of FIGS. 1 & 2, the end cake slot lower attachment bracket member 150 comprises a lower attachment flange portion 152 laterally adjustably secured by bolt members 154, 155 to end wall 58 through slots 156, 157, 158 and an upper mounting flange portion 160 with radially outwardly laterally extending parallel spaced abutment plates 161, 162 fixedly mounted thereon. The intermediate cake slot lower attachment bracket members 151 also include a lower flange portion 163; mounting slots 164, 165, 166; an upper mounting flange portion 167; and abutment plates 168, 169, 170. A second upper attachment bracket member 170 comprises a lower attachment flange portion 172 having a central vertical adjustment attachment slot 174 and laterally extending parallel spaced abutment plates 176, 178 fixedly mounted thereon. The lower flange portion 172 is vertically adjustably mounted against upper flange portion 160 of bracket member 150 by bolt means 180 in slot 174 with abutment plates 176, 178 vertically aligned with abutment plates 162, 164 on lower bracket member 150. Jack screw adjustment means are provided by a pair of bolt members 181, 182 threadably mounted in threaded bores in the upper abutment plate members 176, 178 with lock nuts 184, 186 mounted therebeneath and the bolt heads 188, 190 supported on the upper surfaces of lower radially outwardly extending abutment plate members 161, 162. The construction and arrangement is such that bolt member 180 may be loosened and bolt members 181, 182 turned to adjust the vertical spacing between plate members 161, 162 and 176, 178, respectively, to raise or lower the upper bracket member 170 relative to the lower bracket members 150, 151. Each of the upper bracket members 170 further comprise an axially extending hub portion 192 having a central axially extending bore 194, fixedly supported directly centrally above the lower attachment portion 172.

An alternative form of lower and upper bracket attachment means 150a, 170a is shown in FIGS. 12–15 wherein a lower flange portion 204 of the upper bracket member 170a comprises a pair of spaced vertically extending mounting slots 206, 208 receiving bolt members 209 and a central radially outwardly extending boss portion 210 having a threaded vertically extending bore 212 receiving a threaded adjustment bolt 214 having the head portion 216 supported by a corresponding radially inwardly extending abutment plate portion 218 on the lower bracket member 150a. A laterally radially outwardly offset hub portion 220, having a central axially extending bore 222, is fixedly supported on the upper end of flange portion 204.

In the embodiments of both FIGS. 1-11 and 12-15, an adjustment sleeve means 230, having a central axis of rotation 231, is rotatably adjustably mounted in the bores 194, 222 of the hub portions 192, 220. The sleeve means 230 may be set in any adjusted rotated position by set screw means 232, 234 extending through the wall of hub means 192, 220. In the embodiment of FIGS. 12-15, a square wrench lug portion 236 is integrally formed on the rear end of sleeve means 230 to facilitate rotational adjustment. In each embodiment, the sleeve means 230 comprises an eccentric mounting bore 238 having a central axis 240 eccentrically offset relative to central axis 231 of sleeve means 230.

In each embodiment, a stub shaft member 250 is axially adjustably slidably mounted in sleeve bore 238 and fixed in various axially adjusted positions by a set screw member 252 extending through a slot 253 in hub portions 220 and a threaded bore in sleeve members 230. A transverse mounting pin member 254, providing a vertically upwardly extending pivotal axis 256, extends transversely from the outer end portion of shaft member 250.

A scraper blade mounting bracket 260, FIG. 2, comprises a pivot hub portion 262 having a central vertically extending bore 264 receiving pin member 254; an inclined blade mounting flange portion 266; and a connecting arm portion 268. In the preferred embodiment of FIGS. 1 & 2, the upper outer side surface 270 of bracket flange portion 266 abuts the lower inner side surface 272 of blade center portion 84 and is fastened thereto by bolt members 274, 276. In the embodiment of FIGS. 12-15, the lower inner side surface 278 of bracket flange portion 266 abuts the upper outer side surface 280 of blade center portion 84 and is fastened thereto by bolt members (not shown).

In both embodiments, the construction and arrangement of the parts is such as to provide a plurality of blade position adjustment means for enabling location of the blade assembly in various fixed adjusted positions relative to the associated filter disc unit. The mounting of the lower flange portions 152, 163 of the bracket members 150, 151 by bolts 154, 155 and slots 156-158 and 164-166 provides axial adjustment means for general initial axial adjusting of the position of the entire bracket means relative to the associated filter disc unit. The jack screw means 181, 182 and 214 and the bolt and slot mounting means 174, 180 and 206, 208, provide relatively precise vertical adjustment means for vertical adjustment of the bracket member 170 relative to the bracket members 150, 151 resulting in varying the vertical position and circumferential location of center lines 231, 240 and pin member 254 relative to radial lines 34 and 65 as illustrated by the broken lines in FIGS. 14. The eccentric mounting of shaft member 250 in sleeve member 230 provides vertical and radial adjustment means for moving the pin 254 and the hub 262 between a plurality of adjusted positions such as illustrated by broken lines in FIG. 15. The adjustable slidable mounting of shaft member 250 in bore 238 provides another axial adjustment means enabling additional axial adjustment of the blade assembly relative to the associated filter disc unit as illustrated by broken lines in FIG. 13. The pivotal connection between bracket member 170 and bracket member 260 through pin 254 and hub portion 262 enables axial displacement of the scraper blade assembly means with the associated filter disc unit after the various adjustments have been made and the position of the blade show member 88 fixed relative to the associated filter disc unit. As shown in FIGS. 1, 2 & 12, it is desirable to generally locate pivot pin 254 and upper edge 137 of inner shoe means 70 in relatively close proximity to radial line 34. Also, as shown in FIG. 2, it is preferable to locate front edge 68 of blade shoe 88 in generally coplanar relationship with lower end portion of pivot pin 254 as indicated by center line 265 which is shown to extend at right angles to and through central portions of bottom surfaces 92, 112. In addition, it is desirable to locate center line 256 of pivot pin 254, bottom surfaces 92, 112 and the central longitudinal axis of inner shoe means 70 in parallel relationship at substantially right angles to edge 68 to provide maximum resistance to axial displacement of surfaces 92, 112 in use.

The Outermost Scraper Blade Mounting Bracket Assembly Means

Referring to FIGS. 1 & 8, outermost scraper blade assembly bracket means 67 comprises a tank mounting plate means 300 suitably fixed to end wall 60. A pair of lever members 302, 304 are pivotally connected at the lower ends thereof to bracket means 300 by suitable bolt means 306, 308 and pivotally connected at the upper ends thereof to blade attachment bracket members 310, 312 by suitable bolt means 314, 316. Each of the bracket members 310, 312 comprise a hub portion 318, FIG. 1, an inclined blade mounting flange portion 320, a connecting arm portion 322, and upper and lower connecting flange portions 324, 326. In the preferred embodiment of FIGS. 1 & 8, the central portion 84 of the blade members are mounted on top surface of the flange portion 320 by suitable bolt means 328, 330 and in an alternative embodiment corresponding to FIG. 12, are correspondingly mounted on the bottom surface of the flange portion 320. Upper and lower threaded adjustment rods 332, 334, FIG. 8, extend between and are threadably associated with the upper and lower connecting flange portions 324, 325 and the lower connecting flange portions 326, 327, respectively. In this manner, the locations of pivotal connections 306, 308 and 314, 316 may be varied as necessary or desireable by opposite threaded adjustment of rods 332, 334 to vary the axial positions of the outermost end portions of the blade assembly means 62, 64 to correspond with adjustments made at the radially innermost bracket means 66. After the initial adjustments are made, the rods 332, 334 are locked in the adjusted position by lock nuts 328, 330 to maintain a fixed axially spaced relationship between the scraper blade means 62, 64 and the filter media side surfaces 22, 24 while enabling pivotal movement of the scraper blade assembly means with the associated filter disc unit to accomodate disc wobble.

The Filter Disc Unit Guide And Abutment Means

Referring now to FIGS. 3 & 5-7, each of the filter disc unit guide and abutment means 74, 76 comprise an attachment bracket member 340 having a relatively large area abutment flange portion 342, a relatively small area mounting flange portion 344 spaced from and extending parallel to flange portion 342 to define a mounting slot 346 therebetween, and a curved upper connecting portion 348. Inner side surfaces 350, 352, 354 are spaced and arranged to be mounted on and abut the opposite and top side surfaces of the tank side plates 52, 54. Threaded bolt members 356, 358 extend through threaded openings 360 in a central boss portion 362 on outer flange portion 344 to rigidly fasten the guide means to the cake slot side walls 52, 54 while enabling lateral adjustment along the side walls for proper positioning relative to outer peripheral side surfaces 28, 30 of the filter disc segments 18, 20.

Each filter disc unit guide means 74, 76 further comprises an innermost guide and filter disc segment abutment member 370 made of one piece of molded plastic material which is preferably attached to the side surface of inner mounting flange portion 342 of bracket member 340 by a plurality of outwardly tapered attachment lug portions 372, 374, 376, 378, 380 molded in corresponding outwardly tapered passages in flange portion 342. The upper surface 382 of guide member 370 is downwardly inwardly inclined at an angle of approximately 45° to provide ramp means for control of wobble and centering of the associated filter disc unit 20 by engagement with the outer peripheral side surfaces 28, 30 located between the opposed guide means surfaces 384, 386, while also preventing contrast between the side surfaces of the filter disc units and the cake slot side plates 52, 54.

Assembly, Adjustment and Operation

After assembly of the center shaft means, the tank means, and the filter disc units, the filter disc units are relatively accurately uniformly axially positioned on the center shaft means and substantially uniformly axially spaced from one another. The center shaft means may be then axially adjusted to substantially uniformly center each filter disc unit within its rotational chamber 46 between side plate members 52, 54. However, due to normal manufacturing tolerances, the axial spacing of the various side wall members 50, 52, 54, 56 varies somewhat and the axially spacing of the bolt attachment holes in the inner end wall 58 and in the attachment bracket 300 relative to the adjoining side wall members also is variable. Thus, the bolt and slot type connections 156–158 and 164–166 are provided in the lower flange portions 152, 163 of inner lower bracket members 66 to enable adjustment of the axial locations thereof.

The manufacture of the blade members 80 and the shoe means 70, 72 is quite accurately controlled and the shoe means are relatively accurately located on the blade members 80 by relatively accurate spacing of the shoe means mounting holes in the end portions of the blade flange portion 82 which are preferably in elongated slot form to enable limited axial inward and outward adjustment of each shoe means relative to the blade flange portion 82. In addition, the bracket mounting holes in the end portions of the central panel portion 84 of blade members are relatively accurately spaced and located relative to one another and to the shoe means mounting holes. The relatively accurate rigid forming of the cross sectional configuration of the blade members 80 enables accurate location of the mounting holes during manufacture and in use.

After the blade assembly means 62, 64 and the radially innermost and outermost mounting bracket assembly means 66, 67 have been mounted in approximately the desired position relative to the associated filter disc unit, final adjustments are made to very accurately locate and position the edge portion 68 of the scraper blade assembly means relative to the associated filter media side surface; to very accurately locate and position the shoe means 70, 72 relative to the radially innermost and outermost peripheral edges of the filter media; and to very accurately locate and position the shoe means 70 and the pivot pin 254 relative to the radial line 34 and to one another. Limited axial adjustments may be made by adjustably fixedly varying the axial location of shaft member 250 relative to the sleeve member 230, as illustrated in FIG. 13, as enabled by set bolt 252. Limited circumferential adjustments may be made by fixedly adjustably varying the circumferential location of upper bracket member 170, 170a relative to the lower bracket member 150 as enabled by the jack screw means 181, 182 as illustrated in FIG. 14. Limited radial and circumferential adjustments may be made by rotation of sleeve 230 in hub portion 192 to adjustably fixedly vary the location of the axis of shaft member 150 relative to the axis of the hub portion 220, as illustrated in FIG. 15 and as enabled by set bolts 232, 234, with the position of pivot pin member 254 being fixedly adjustable by rotation of shaft member 250 relative to sleeve member 230 as enabled by set bolt 252. The axial location of the radially outermost end portion of the blade assembly means and the shoe means 72 relative to the associated filter disc unit may be adjustably fixedly varied by the adjustment means comprising threaded connecting bolt members 332, 334 and lock nut members 328, 330, FIG. 8.

In operation, each scraper blade assembly means 62, 64 are rigidly supported relative to the associated filter disc unit by the radially innermost and radially outermost cake scraper-blade supporting shoe means 70, 72 by the flat large area bottom surfaces 112 which are fixedly held in sliding abutting engagement with the radially innermost and radially outermost flat parallel side surfaces 28, 30 and 40, 42 of the associated filter disc unit. The use of a low friction plastic material reduces frictional forces to a minimum. The axial spacing of the flat bottom surfaces 92 of the scraper blade shoe 88 relative to the associate filter media side surfaces 22, 24 is uniformly maintained by the abutting engagement between the bottom surfaces 112 of the cake scraping-blade supporting shoe means 70, 72 and the peripheral side surfaces 28, 30 and 40, 42 of the associated filter disc unit and by the axially fixed relationship of the pivotal axes 256 of the radially inner mounting bracket assembly means 66 and the axially fixed relationship of the pivotal axes 314, 316 of the radially outer mounting bracket means 67. The desired axial relationships are maintained throughout rotation of the associated filter disc unit in spite of wobble thereof by means of the pivotal connections provided by the radially innermost mounting bracket pins 254 and hub portions 262 and the radially outermost mounting bracket pivotal connections 306, 308, 314, 316.

In the presently preferred embodiment, the cutting edge portions 137 of the cake scraping and blade supporting shoe means 70, 72 are located in closely radially spaced juxtaposition to the radially innermost and radially outermost circumferentially extending peripheral edge portions of the filter media to cut away the cake in as close spaced proximity thereto as enabled by the configuration thereof without contact therewith during rotation. In addition, the cutting edge 137 is located along a radial line 34 including the pivot pin 254 to eliminate torsional forces therebetween. The front surface 135 is inclined to direct cake radially away from surfaces 28, 30 and 40, 42 with minimum resistance and the upper front surface 128 is shaped to form an inclined trough 133 for the same purpose. The use of low friction plastic material helps prevent adhesion of the cake material to the surfaces of the shoe means 70, 72. Thus, the construction and arrangement is such as to peel away the cake from the support surfaces 28, 30 and 40, 42. The surfaces 114, 116 and 124 are arranged relative to surface 112 to provide maximum rigidity relative to the blade member 80 and to the cake on the support surfaces 28, 30 and 40, 42. As shown in FIG. 2, pivot axis 256 and bottom surfaces 92, 112 are parallel and the bottom portion of the pivot pin 254 is directly axially opposite, although radially offset from, center portions of both bottom surfaces 92, 112 as indicated by center line 265. In this manner, forces applied against bottom surfaces 92, 112, as by cake build-up, are directly oppositely opposed by the mounting bracket means and are applied at right angles to and in circumferential alignment with the pivotal axis 256 and pivot pin 254 to enable uninterrupted operation.

The amount of rotational wobble of the filter disc units is limited by the guide and abutment means 74, 76 with the radially outermost side surfaces 28, 30 of the filter disc unit being intermittently slidably abuttingly engageable with side surfaces 384 of the low friction plastic portions 370 of the guide and abutment means. The inclined surfaces 382 prevent jamming in the event that any obstacles are encountered such as cake build-up on surfaces 28, 30.

While the inventive concepts have been shown and described by reference to the foregoing illustrative embodiments of the invention, it is contemplated that the inventive concepts may be otherwise variously employed in alternative embodiment of the invention and it is intended that the following claims be construed to include alternative embodiments except insofar as limited by the prior art.

What is claimed is:

1. In a rotary disc filter machine comprising a rotatable center shaft means continuously rotatable in one direction and a plurality of axially spaced filter disc units mounted on and rotatable with the center shaft means, each filter disc unit comprising a plurality of filter disc segments having radially and circumferentially extending axially spaced oppositely facing parallel filter media side surfaces on which filter cake is deposited and radially innermost and radially outermost circumferentially extending axially spaced oppositely facing parallel support surfaces circumjacent the filter media side surfaces; the invention of scraper blade apparatus sequentially associated with each filter media side surface of each filter disc segment of each filter disc unit comprising:

main scraper blade means mounted in axially spaced juxtaposition to and extending generally radially across an associated filter disc unit for sequentially removing filter cake from the axially adjacent filter media side surfaces of each filter disc segment during each revolution of the associated filter disc unit;

a radially innermost main scraper blade mounting bracket means being mounted in fixed axial relationship to and being located radially inwardly adjacent the associated filter disc unit for supporting the radially innermost end portion of the main scraper blade means in sequential uniform closely axially spaced juxtaposition to the axially adjacent filter media side surface of each of the filter disc segments of the filter disc unit during each revolution of the filter disc unit;

a second radially outermost main scraper blade mounting bracket means being mounted in fixed axial relationship relative to and being located radially outwardly adjacent the associated filter disc unit for supporting the radially outermost end portion of the main scraper blade means in sequential uniformly axially spaced juxtaposition to the axially adjacent filter media side surface of each of the filter disc segments of the filter disc unit during each revolution of the filter disc unit; and cake scraping and blade supporting shoe means mounted on the radially innermost and the radially outermost end portions of the main scraper blade means for continuous sequential sliding abutting engagement with the radially innermost and radially outermost circumferentially extending supporting surfaces of each filter disc segment of the associated filter disc unit to locate said main scraper blade means in predetermined axially spaced relationship to the adjacent filter media side surface and for removing filter cake from the support surfaces to maintain the predetermined axial spacing of said main scraper blade means relative to the adjacent filter media side surface.

2. The invention as defined in claim 1 and wherein each of said cake scraping and blade supporting shoe means comprises:

a flat bottom support surface slidably abuttably engaging the associated support surface of each filter disc segment of the associated filter disc unit;

a transversely inclined front edge surface facing opposite the direction of movement of the associated filter disc unit and extending at an acute angle relative to the direction of rotation; and an inclined top surface facing opposite the direction of movement of the associated disc filter.

3. The invention as defined in claim 2 and wherein each of said cake scraping and blade supporting means further comprising:

a pair of flat side wall surfaces extending generally parallel to the path of movement of the associated disc filter unit; and said inclined front edge surface extending between and intersecting one of said flat side wall surfaces at an acute angle defining a triangularly shaped leading cutting edge portion having an apex facing opposite the direction of movement of the associated filter disc unit.

4. The invention as defined in claim 3 and wherein said cake scraper and blade supporting means being made of one piece of molded plastic material.

5. The invention as defined in claim 4 and wherein:

said cutting edge portions being located in closely spaced next circumjacent relationship to the radially innermost and outermost circumferentially extending peripheral edge portions of the filter media surfaces.

6. The invention as defined in claim 5 and where said scraping and blade supporting means further comprising an inclined trough on the top surface next adjacent said inclined front edge surface.

7. The invention as defined in claim 1 and wherein said main scraper blade means comprising:

an elongated blade member;

an integral elongated relatively narrow width innermost flange portion on one side of said blade member located next adjacent the associated filter media side surface of the filter disc segments of the associated filter disc unit and being downwardly inclined relative thereto and forming an acute angle therebetween;

an integral elongated relatively wide central panel portion on said blade member rigidly connected to said innermost flange portion and extending downwardly axially outwardly away from the said innermost elongated flange portion and being inclined relative to the innermost flange portion and being inclined relative to the associated filter media surface at a lesser acute angle therebetween than the acute angle between said innermost elongated flange portion and the associated filter media surface; and an integral elongated relatively narrow width outermost flange portion on said blade member rigidly connected to said central panel portion and extending axially inwardly toward the associated filter media surface from said central panel portion.

8. The invention as defined in claim 7 and wherein:
said cake scraping and blade supporting means being rigidly mounted on the opposite radially innermost and radially outermost end portions of said innermost flange portion.

9. The invention as defined in claim 8 and wherein:
said radially innermost blade mounting bracket means being connected to a radially innermost end portion of said central panel portion; and
said radially outermost blade mounting bracket means being connected to a radially outermost end portion of said central panel portion.

10. The invention as defined in claim 1 and the rotary disc filter further comprising alternate axially spaced filter disc unit rotational chamber means and cake removal slot means for each filter disc unit defined by axially spaced parallel radially extending side plate means between which the associated filter disc unit rotates during cake removal; and the invention further comprising for each filter disc unit:

filter disc unit guide and abutment means mounted on the side plate means for engagement with the radially outermost circumferentially extending axially spaced oppositely facing parallel support surfaces circumjacent the filter media side surfaces.

11. The invention as defined in claim 10 and wherein each of said filter disc unit guide and abutment means comprising:

a mounting plate member attached to the associated side plate means;
a guide block member attached to said mounting plate member and located in the associated filter disc unit rotational chamber means axially next adjacent the associated filter disc unit; and
a radially extending side guide surface means on said guide block member located axially next adjacent the associated filter disc unit for intermittent sliding abutting engagement with the associated one of the radially outermost circumferentially extending axially spaced oppositely facing parallel support surfaces of the associated filter disc unit.

12. The invention as defined in claim 11 and wherein said guide block member being made of one piece of molded plastic material.

13. The invention as defined in claim 1 and wherein said radially innermost mounting bracket assembly means comprises:

first circumferential position adjustment means for generally adjustably varying the circumferential location of the radially innermost end portion of the main scraper blade means and the cake scraping and blade supporting shoe means relative to the associated filter disc unit;

second axial position adjustment means for adjustably varying the axial location of said main scraper blade means relative to the associated filter disc unit; and third radial and circumferential position adjustment means for adjustably varying both the radial and circumferential location of the radially innermost end portion of the main scraper blade means and the cake scraping and blade supporting shoe means relative to the associated filter disc unit.

14. The invention as defined in claim 13 and wherein said radially innermost mounting bracket assembly means further comprising:

pivotal connecting means located between said main scraper blade means and the various adjustment means for enabling pivotal movement of the main scraper blade means relative to the various adjustment means.

15. The invention as defined in claim 14 and wherein said pivotal connecting means providing a pivotal axis extending generally tangentially relative to the rotational path of movement of the associated disc filter unit for enabling pivotal swinging movement of the main scraper blade means with the associated filter disc unit.

16. The invention as defined in claim 15 and wherein said third radial and circumferential position adjustment means comprising:

axially extending hub means having a central bore for providing an axially extending axis of rotation;
axially extending sleeve means mounted in said central bore for variable fixedly adjustable rotation relative to said hub means and having an eccentric axially extending bore therein;
a connecting shaft means mounted in and having a central axis coaxial with said eccentric bore for variable fixedly adjustable circumferential displacement relative to said hub means during rotation of said sleeve means; and
said pivotal connecting means being mounted on said connecting shaft means with said pivotal axis extending transversely to said central axis of said connecting shaft means.

17. The invention as defined in claim 16 and wherein said second axial position adjustment means comprising:

said connecting shaft means being axially variably fixedly adjustably slidably supported in said eccentric bore in said sleeve means; and
shaft retaining means associated with said hub means and said connecting shaft means to adjustably fixedly locate said connecting shaft means relative to said hub means.

18. The invention as defined in claim 17 and wherein said first circumferential position adjustment means being operatively associated with said hub means for variably circumferentially locating said hub means relative to the associated filter disc unit.

19. The invention as defined in claim 18 and wherein said radially innermost bracket assembly means further comprising:

a first bracket means fixedly mounted on the tank means for connecting said main scraper blade means to the tank means;
a second bracket means including said hub means being adjustably fixedly mounted on said first bracket means for connecting said main scraper blade means to said first bracket means;

said first circumferential position adjustment means being operatively associated with and mounted between said first bracket means and said second bracket means; and a third bracket means mounted on said main scraper blade means and including a portion of said pivotal connecting means for connecting said main scraper blade means to said second bracket means through said pivotal connecting means and said connecting shaft means and said sleeve means and said hub means.

20. The invention as defined in claim 19 and further comprising:

fourth axial adjustment means between said first bracket means and the tank means for adjustably fixedly varying the axial location of said bracket assembly means relative to the associated filter disc unit.

21. The invention as defined in claim 19 and wherein said first circumferential position adjustment means comprising:

first abutment plate means on said first bracket means for providing a fixed rigid reaction surface;

second abutment plate means on said second bracket means for providing a movable rigid reaction surface oppositely spaced from said fixed rigid reaction surface; and jack screw means adjustably mounted between said first abutment plate means and said second abutment plate means for applying force between said fixed rigid reaction surface and said movable rigid reaction surface to vary the spacing therebetween.

22. The invention as defined in claim 15 and wherein said cake scraping and blade supporting means further comprising:

an inclined front edge surface facing opposite the direction of movement of the associated filter disc unit and forming an acute angle relative thereto;

a triangularly shaped leading cutting edge portion on one side of said inclined front edge surface; and said pivotal connecting means and said leading cutting edge portion being located along and in closely spaced juxtaposition to a common radial line extending from the center of rotation.

23. The invention as defined in claim 1 and further comprising:

radially innermost pivotal connecting means between said radially innermost bracket means and said main scraper blade means for enabling pivotal axial displacement of said main blade means in fixed axially spaced relationship to the associated filter disc unit during rotational wobble thereof; and radially outermost pivotal connecting means between said radially outermost bracket means and said main scaraper blade means for enabling pivotal axial displacement of said main scraper blade means in fixed axially spaced relationship to the associated disc filter unit during rotational wobble thereof.

24. The invention as defined in claim 1 and wherein said radially innermost main scraper blade mounting bracket means comprising:

a first vertically extending lowermost mounting bracket member having a first lower flange portion axially adjustably fixedly attached relative to the associated filter disc unit and a second upper flange portion;

a second vertically extending uppermost mounting bracket member having a lowermost flange portion vertically fixedly adjustably attached to said upper flange portion of first mounting bracket member and having an uppermost hub portion with an elongated mounting bore extending axially generally parallel to the central axis of rotation;

a sleeve member rotatably fixedly adjustably mounted in said elongated mounting bore of said hub portion and extending axially generally parallel to the central axis of rotation and having an eccentric bore therein extending generally axially parallel to the central axis of rotation;

a support shaft member fixedly axially adjustably mounted in said eccentric bore and having rotatable within said sleeve member between various eccentrically located positions relative to said mounting bore in said hub portion of said second mounting bracket member;

a pivot pin member fixedly mounted on said support shaft member and extending radially outwardly relative thereto; and a third mounting bracket member connecting said support shaft member to said main scraper blade means through said pivot pin member and having a pivot hub portion rotatably mounted on said pivot pin member and having an end flange portion fixedly connected to and supporting the radially innermost end portion of said main scraper blade means and having a connecting arm portion extending between said end flange portion and said hub portion whereby said main scraper blade means is pivotally supported by said pin member and said main scraper blade means is variously adjustably supported by said support shaft member.

25. The invention as defined in claim 24 and wherein said radially innermost main scraper blade mounting bracket means further comprises:

first blade adjustment means operably associated with said first bracket member and said second bracket member for adjustably varying the vertical location of said hub portion and said sleeve portion of said second bracket member and said support shaft member therewithin relative to said first bracket member between various adjustable fixed locations.

26. The invention as defined in claim 25 and wherein said first blade adjustment means comprises:

pin and slot connecting means for adjustably connecting said second mounting bracket member to said first mounting bracket member; and jack screw means operatively associated with said first bracket member and said second bracket member for variously vertically positioning said second bracket member relative to said first bracket member.

27. The invention as defined in claim 24 and wherein said radially innermost main scraper blade mounting bracket means further comprises:

second blade adjustment means operably associated with said sleeve member and said support shaft member for adjustably varying the vertical and radial location of said eccentric bore and said support shaft member between various adjustably fixed eccentric locations.

28. The invention as defined in claim 27 and wherein said radially innermost main scraper blade mounting bracket means further comprises:

third blade adjustment means operably associated with said sleeve member and said support shaft member for adjustably varying the axial location of said support shaft member relative to said sleeve member between various adjustably fixed axial locations.

29. The invention as defined in claim 1 and further comprising:

pivotal connecting means located between said main scraper blade means and said radially innermost mounting bracket assembly means;

the pivotal connecting means having a pivotal axis extending at substantially a right angle relative to said main scraper blade means;

the main scraper blade means having an edge portion located axially next adjacent the associated filter media side surface and extending radially opposite said pivotal connecting means and at substantially a right angle relative to said pivot axis; and said cake scraping and blade supporting shoe means being located radially outwardly opposite said pivotal connecting means in radial alignment with said pivotal connecting means and said edge portion.

30. The invention as defined in claim 29, and further comprising:

adjustment means operatively associated with said radially innermost mounting bracket assembly means for adjustably locating said pivotal connecting means, said pivotal axis, said edge portion of said main scraper blade means, and said cake scraping and blade supporting shoe means in predetermined relative positions are locations.

31. The invention as defined in claim 30 and wherein said adjustment means comprising:

first circumferential position adjustment means for generally adjustably varying the circumferential location of the radially innermost end portion of the main scraper blade means and the cake scraping and blade supporting shoe means relative to the associated filter disc unit;

second axial position adjustment means for adjustably varying the axial location of said main scraper blade mens relative to the associated filter disc unit; and third radial and circumferential position adjustment means for adjustably varying both the radial and circumferential location of the radially innermost end portion of the main scraper blade means and the cake scraping and blade supporting shoe means relative to the associated filter disc unit.

* * * * *